United States Patent [19]

Noll et al.

[11] 3,870,556

[45] Mar. 11, 1975

[54] TEXTILE FINISHING COMPOUNDS

[75] Inventors: Klaus Noll; Gunter Oertel, both of Koeln; Karl Schafer, Opladen, all of Germany

[73] Assignee: Bayer Aktiengesellschaft, Leverkusen, Germany

[22] Filed: Sept. 26, 1973

[21] Appl. No.: 400,764

Related U.S. Application Data

[62] Division of Ser. No. 244,200, April 14, 1972, abandoned.

[30] Foreign Application Priority Data

Apr. 24, 1972 Germany............................ 2120090

[52] U.S. Cl................ 117/141, 8/127.6, 8/DIG. 11
[51] Int. Cl............................................. C08h 19/02
[58] Field of Search ............. 117/141, 138; 8/127.6, 8/128 A, DIG. 11

[56] References Cited

UNITED STATES PATENTS

| | | | |
|---|---|---|---|
| 3,498,740 | 3/1970 | Cain | 8/127.6 |
| 3,558,264 | 1/1971 | Habib | 8/127.6 |
| 3,654,338 | 4/1972 | Krimm et al. | 260/463 |
| 3,687,605 | 8/1972 | Farmer | 8/127.6 |
| 3,702,776 | 11/1972 | Wagner | 8/127.6 X |

FOREIGN PATENTS OR APPLICATIONS 1,097,516   1/1968   Great Britain ..................... 117/141

*Primary Examiner*—William E. Schulz
*Attorney, Agent, or Firm*—Gene Harsh

[57] ABSTRACT

Higher molecular weight ester group containing isocyanates are provided. These isocyanates are eminently well suited as treating compounds for fabrics which contain keratin fibres.

4 Claims, No Drawings

TEXTILE FINISHING COMPOUNDS

This is a division of application Ser. No. 244,220, filed Apr. 14, 1972, now abandoned.

This invention relates to a new higher molecular weight polyisocyanates, a process for producing them and their use for finishing textiles which contaian keratin fibres.

Many treatment methods for improving the undesirable properties of wool fabrics, or of fabrics which contain keratin fibres, are known. The undesirable propereties which these methods are designed to improve are mainly the tendency of keratin fibres to felt and shrink after repeated washing. Most of these methods, however, achieve these improvements in properties at the expense of reduced fibre strength, or reduced quality in the handle of the treated material. A well known process described in British Patent Specification No. 1,062,564, for example, consists of the application of medium molecular weight to high molecular weight organic compounds which contain isocyanate end groups. These compounds not only result in a harder handle of the finished goods but also entail substantial disadvantages in their preparation.

The preparation of these high molecular weight compounds which contain isocyanate end groups is carried out by reacting a polymer which contains OH end groups with polyisocyante, using about one mol of polyisocyanate per OH group. A reaction of this type is well known to give rise to a marked increase in the molecular weight which may give rise to difficulties, such as, for example, in using the reaction product in an aqueous emulsion. In addition, the reaction product generally contains considerable quantities of unreacted polyisocyanate which, for physiological reasons, cannot be left in the product. The desired products are therefore frequently prepared by using an excess of the polyisocyanate which must be removed by, for example, a distillation process after the reaction. This distillation subjects the material to considerale thermal stresses and entails considerable costs. Even with this procedure, it is not possible to avoid an increase in molecular weight (and hence viscosity) and moreover the products obtained are not completely uniform.

In all the known processes, linkage of the polyisocyanate to the polymers which contain OH end groups takes place via a urethane group which, as is well known, may itself undergo a side reaction with isocyanate groups to form allophanate groups. The end product of such a reaction therefore does not have the same functionality as the original polymer. It is therefore obvious to assume that this side reaction results in a higher functionality in the end product as a result of branching. This is bound to affect the properties of the resulting finishes used for keratin fibres, and in particular when such polyisocyanates which have a largely uncontrollable functionality are used for finishing textiles, the handle of the finished textiles is distinctly inferior in quality. The fact that this side reaction continues slowly at room temperature with formation of allophanate groups is the cause for another disadvantage of the higher molecular weight polyisocyanates produced in this way in that the reaction products have only a limited storage life in the solvent-free state. After prolonged storage, the viscosity of the products increases so that their use for finishing keratin fibres is seriously impaired. Aromatic polyisocyanates have frequently been used for producing the higher molecular weight polyisocyanates known in the art. These polymers are also liable to undergo the above-mentioned disadvantageous side reaction to an increased extent owing to the higher reactivity of the aromatic isocyanate group. Furthermore, the products produced from them tend to undergo yellowing under the action of light.

It is therefore an object of this invention to provide wool fabrics or fabrics containing keratin fibres devoid of the foregoing disadvantages. It is another object of this invention to provide novel higher molecular polyisocyanates. It is a further object of this invention to provide textile materials which contain keratin fibres treated with the novel polyisocyanates of the invention.

The foregoing objects and others which will become apparent from the following description are accomplished in accordance with the invention generally speaking by providing higher molecular weight polyisocyanates which do not contain Zerewitinow-active hydrogen atoms which are eminently suitable for finishing textiles which contain keratin fibres. The new polyisocyanates are indefinitely stable in storage and, when applied to keratin fibres, they afford advantages with regard to the handle while improving to the same desirable degree the above-mentioned adverse properties of keratin fibres.

This invention provides polyisocyanates of the following general formula:

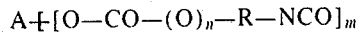

wherein $m$ is an integer of from 2 to 10, $n$ is 0 or 1,

A is an m-valent radical having a molecular weight of from about 500 to about 18,000 which is free from Zerewitinow-active hydrogen atoms, which radical may be obtained by removal of the hydroxyl groups from a polymer which contains free hydroxyl groups, and R is a divalent aliphatic or cycloaliphatic hydrocarbon radical containing one to 20 carbon atoms, and preferably five to 10 carbon atoms.

This invention also provides a process for the preparation of these polyisocyanates, which process comprises reacting hydroxyl compounds of the general formula:

with isocyanates of the general formula:

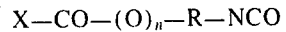

wherein X is chlorine, bromine or iodine and $m$, $n$, A and R are as defined hereinabove, in the presence of a quantity of a substance which will bind hydrogen halide in a quantity at least equivalent to the quantity of the isocyanate, if desired in the presence of an inert organic solvent.

This invention also provides textiles which contain keratin fibers which are treated with the novel polyisocyanates.

The process according to the invention is based on the fact that the reaction between halocarbonyl groups and hydroxyl groups is much more vigorous than the reaction between NCO and OH.

Owing to this very high reactivity of halocarbonyl groups, compounds which contain hydroxyl groups may be reacted selectively with isocyanates which contain halocarbonyl groups while preserving the isocyanate groups in accordance with the following reaction scheme:

$$-OH + X-CO-(O)_n-R-NCO \rightarrow$$
$$-O-CO-(O)_n-R-NCO + HX$$

The hydrogen halide liberated in this reaction is advantageously removed by a substance which binds hydrogen halide. The process according to the invention may be carried out either solvent-free or in the presence of inert solvents at between about 0°C. and about 100°C., preferably between about 20°C. and about 50°C. The polyhydroxyl compounds, halocarbonylisocyanates and hydrogen halide absorbents are preferably used in equivalent quantities in the process according to the invention.

The polyols used may be any known compounds which contain hydroxyl groups but no Zerewitinow-active hydrogen atoms and which have a molecular weight of from about 500 to about 18,000, preferably from about 1,000 to about 5,000, and an OH functionaliity of 2 to 10, and preferably 2 to 4. polyhydroxyl compounds preferably used for the process according to the invention are polyesters which contain terminal hydroxyl groups or polyethers which contain terminal hydroxyl groups. The following are some suitable examples of polyols which are particularly suitable for the purpose: polyesters of aliphatic or aromatic polycarboxylic acids such as, for example, adipic acid, succinic acid, maleic acid, phthalic acid, isophthalic acid, terephthalic acid or hexahydrophthalic acid; polyalcohols such as, for example, ethylene glycol, propane diols, butane diols, hexane diols, 2,2-dimethylpropane-1,3-diol, diethylene glycol or xylylene glycol, or, in the case of higher functional polyestes, the polyalcohols glycerol, trimethylol propane and pentaerythritol; polyesters of w-hydroxy decanoic acid, caprolactone, and the like; naturally occuring saturated or unsaturated polyesters; polyesters of carbonic acid (polycarbonates) which may be obtained, for example, from hydroquinone, diphenylol propane, p-xylylene glycol, ethylene glycol, butane diols, or hexane-1,6-diol and other polyesters may be obtained by well-known condensation reactions, such as, for example, with phosgene or diethyl or diphenyl carbonate or from cyclic carbonates such as glycol carbonate or vinylidene carbonate in known manner.

Polyethers suitable for the process according to the invention are, in particular, these which may be obtained by alkoxylation of suitable initiator molecules such as, for example, water, ethylene glycol, propylene glycol, hexamethylene glycol, trimethylol propane, glycerol, pentaerythritol, and the like with alkylene oxides such as, for example, ethylene oxide, propylene oxide, 2,3-butylene oxide, epichlorohydrin, 4,4'-diphenylpropane-bis-(2,3-epoxypropyl ether) and the like.

Halocarbonyl isocyanates which are suitable for the process according to the invention are those of the following general formula:

$$X-CO-(O)_n-R-NCO$$

wherein $n$, X and R are as defined hereinabove.

The preparation of such compounds is described, for example, in German Patent Specification Nos. 1,222,919 and 1,228,249. Representative of these compounds suitable for the process according to the invention are, for example, chlorocarbonyl methyl isocyanate, 2-(chlorocarbonyl)-ethyl isocyanate, 5-(chlorocarbonyl)-pentyl isocyanate, 10-(chlorocarbonl)-decyl isocyanate, 4-(chlorocarbonyl)-cyclohexyl isocyanate, 4-(chlorocarbonyl)-hexahydrobenzyl isocyanate, 2-isocyanato-2-(chlorobonyloxy)-ethane, 1-isocyanato-6-(chlorocarbonyloxy)-hexane, 1-isocyanato-12-(chlorocarbonyloxy)-dodecane and the corresponding bromocarbonyl and iodocarbonyl compounds. The preferred halocarbonyl isocyanates for the process according to the invention are 10-(chlorocarbonyl)-decyl isocyanate-(11-isocyanato-undecanoic acid chloride) and 5-(chlorocarbonyl)-pentyl isocyanate-(6-isocyanato caproic acid chloride).

The substances used for binding or absorbing hydrogen halide are preferably bases which are compatible with the reactants and soluble in the solvents used and which do not contain any Zerewitinow-active hydrogen atoms. Typical examples are triethylamine, tributylamine, pyridine and the like.

The solvents which may be used in the process according to the invention are, in particular, aliphatic, cycloaliphatic or aromatic hydrocarbons, chlorinated hydrocarbons, ethers, ketones, esters, and the like which do not contain active hydrogen atoms. It is advantageous to use solvents which have a boiling point below about 100°C. Solvents may generally be dispensed with if the polyols have a molecular weight of not more than about 5,000 because such polyols have a sufficiently low viscosity and hence require no dilution to expedite handling.

The process according to the invention is preferably carried out by introducing the halocarbonyl isocyanate, if desired dissolved in a solvent, into a reaction vessel and slowly adding the mixture of polyol and hydrogen halide absorbent, if desired in the form of a solution in the solvent. The end of the reaction is detected by the cessation of heat evolution. Stirring is then generally continued for several hours at room temperature. The precipitated salt produced by the reaction of the hydrogen halide with the amine is removed by filtration and the solvent is removed by distillation, preferably under vacuum.

Treatment of the textiles which contain keratin fibres with the products according to the invention may be carried out either with solutions of the said product in organic solvents, preferably in perchloroethylene, or with aqueous emulsions of the products. Suitable emulsions for applying the polyisocyanates according to the invention by the process according to the invention may easily be prepared by mixing the polyisocyanates with from about 1 to about 10 percent by weight of a suitable emulsifier and then stirring the resulting mixture into water.

The emulsifiers may be either non-ionic emulsifiers which contain both hydrophobic hydrocarbon units and hydrophilic polyethylene ether glycol units such as, for example, 3-benzyl-4-hydroxy-biphenyl-polyglycol ether, or ionic emulsifiers, such as, for example, the sodium salt of a commercial paraffin sulphate.

The textiles are immersed in solutions of the products, preferably in perchloroethylene, and then the excess is squeezed off or centrifuged off. They may also be sprayed with the solutions. If aqueous emulsions are employed, the textiles are also treated by immersion and squeezing off or centrifuging off the excess liquid.

The polyisocyanates according to the invention are generally used in the form of solutions or emulsions having a solids content of from about 1 to about 15 percent by weight. If desired, the textiles may also be sprayed with the aqueous emulsions. The textile is thereafter freed from organic solvents by, for example, evaporation with hot air, at from about 80°C. to about 140°C., preferably from about 90°C. to about 120°C., or dried after treatment in aqueous baths.

The textiles may thereafter be treated with steam, if desired with simultaneous application of pressure, in order to shape them or to stabilize their surface dimensions.

It is often advisable to store these treated textiles for several days at room temperature.

The keratin textiles preferably finished in accordance with the invention are woven fabrics containing keratin fibres, in particular wool fabrics, but other textiles, such as, for example, knitted or warp knitted goods which contain keratin fibres, may also be finished according to the invention.

The following Examples are intended to illustrate but not limit the invention wherein all parts and percentages are by weight unless otherwise indicated.

EXAMPLE 1

A solution containing about 60 parts of a polyisocyanate having an isocyanate group content of about 3.72 percent in one litre of perchloroethylene is prepared.

A woven woolen fabric is immersed in the solution of polyisocyanate and then squeezed to reduce the uptake of treatment solution to about 140 percent.

The organic solvent is removed in about 10 minutes with hot air at about 100°C. The woolen fabric is stored for several days at room temperature.

In contrast to an untreated fabric, the fabric treated in accordance with the invention has an open, smooth surface texture after repeated washing in a washing machine and is not felted. Shrinkage of the woolen fabric which is treated according to the invention is considerably reduced, as the figures in the following table show.

|  | % Total Shrinkage After 10 Machine Washings at 60°C. | | Appearance of Fabric |
| --- | --- | --- | --- |
|  | Warp | Weft |  |
| Fabric Treated According to the Invention | 2.6% | 1.0% | Open, Not Felted |
| Untreated Fabric | 15.2% | 8.1% | Severely Felted |

The polyisocyanate is prepared as follows: About 245.5 parts of 11-isocyanato-undecanoic acid chloride are dissolved in about 300 parts by volume of ethyl acetate, and a solution of about 1000 parts of a trifunctional polyether of 1,1,1-trimethylol propane and propylene oxide with OH number 56 and about 102 parts of triethylamine in about 500 parts by volume of ethyl acetate is added slowly at room temperature such that the temperature does not rise above about 30°C. The reaction mixture is stirred overnight and the resulting suspension is filtered. The filtrate is then freed from solvent under vacuum. A slightly viscous, pale yellow liquid remained behind in almost quantitative yield.

EXAMPLE 2

A solution containing about 40 parts of a polyisocyanate which has a free isocyanate group content of about 3.55 percent in one litre of perchloroethylene is prepared.

A woven fabric of wool is treated with the solution of polyisocyanate as described in Example 1. The fabric treated according to the invention does not felt when washed and shrinkage is considerably less than in the untreated fabric.

|  | % Total Shrinkage After 10 Machine Washings at 60°C. | | Appearance of Fabric |
| --- | --- | --- | --- |
|  | Warp | Weft |  |
| Fabric Treated According to the Invention | 1.2% | 2.0% | Open, Not Felted |
| Untreated Fabric | 15.9% | 8.9% | Severely Felted |

The polyisocyanate is prepared as follows: About 490 parts of 6-isocyanato-caproyl chloride in about 500 parts by volume of ethyl acetate are reacted with a solution of about 2,800 parts of the polyether described in Example 1 and about 284 parts of triethylamine in about 1,000 parts by volume of ethyl acetate as described in Example 1 and stirred for about 16 hours. The solution is worked up as described in Example 1, a slightly viscous pale yellow liquid is obtained in almost quantitative yield.

EXAMPLE 3

A solution containing, per litre of perchloroethylene, about 16 parts of a polyisocyanate which has a free isocyanate group content of about 3.47 percent is prepared.

Samples of knitted wool yarn are immersed in the solution of polyisocyanate and then centrifuged such that the weight increase of the specimens are about 280 percent due to uptake of treatment solution. The organic solvent is then removed with hot air at about 90°C.

The treated samples are then steam treated under pressure on a steam press for about 30 minutes.

The knitted samples treated according to the invention are, in contrast to untreated samples, substantially free from felting after washing and their surface appears smooth and open-textured.

The knitted samples are testd for freedom from felting by means of a cubex apparatus in accordance with specification 7a of IWS.

| Shrinkage Due to Felting After 60 Minutes Cubex Test | | |
| --- | --- | --- |
|  | Length | Width |
| Knitted Specimens Treated According to the Invention | +2.0% | +1.5% |
| Untreated Knitted Specimens | −28.9% | −32.3% |

The polyisocyanate is prepared as follows: A mixture of about 2,000 parts of the polyether described in Example 1 and about 230 parts by triethylamine is slowly added to about 351 parts of 6-isocyanatocaproyl chloride at about 20°C. After completion of this operation, the reaction mixture is stirred at room temperature for about 8 hours. After removal of the precipitated triethyl ammonium chloride by suction filtration, the reaction product, which contains NCO end groups, is obtained in the form of a pale yellow liquid of low viscosity in a yield of about 95 percent.

EXAMPLE 4

About 10 parts of an emulsifier and about 90 parts of water are added to about 100 parts of the polyisocyanate of Example 3 and the mixture is worked up to an aqueous emulsion by means of a high speed stirrer.

The emulsifier used is a 50 percent aqueous solution of equal parts of benzyl-p-hydroxy-diphenyl polyglycol ether and the sodium salt of paraffin sulphate.

A woven wool fabric is treated with an aqueous liquor which contains, per litre of water, about 80 parts of the above described emulsion of the polyisocyanate and about 25 parts of a 40 percent aqueous dispersion of a copolymer of about 80 parts of butyl acrylate, about 10 parts of styrene and about 10 parts of acrylamide.

The wool fabric is immersed in the aqueous liquor and squeezed to reduce the weight increase due to liquid uptake to about 100 percent. The fabric is dried at about 100°C. for about 10 minutes and stored at room temperature for about 6 days.

After several washes, the wool fabric treated according to the invention has a smooth, non-felted surface and its crease-resistance is considerably better than that of an untreated fabric.

|  | % Total Shrinkage After 10 Machine Washings at 60°C. | | Appearance of Fabric |
|---|---|---|---|
|  | Warp | Weft |  |
| Fabric Treated According to the Invention | 2.8% | 0.8% | Open, Not Felted |
| Untreated Fabric | 16.1% | 9.6% | Severely Felted |

|  | Dry Crease Angle (DIN 53 890) | | Wet Crease Angle (Total) | |
|---|---|---|---|---|
|  | Warp | Weft | Warp | Weft |
| Fabric Treated According to the Invention | 137°C. | 144°C. | 126°C. | 140°C. |
| Untreated Fabric | 128°C. | 137°C. | 120°C. | 129°C. |

Although the invention is described in considerable detail in the foregoing Examples, it is to be understood that such exemplification is solely for purposes of illustration and that many variations may be made by one skilled in the art without departing from the spirit and scope of the invention.

What is claimed is:

1. A textile, containing keratin fibres, treated with a polyisocyanate having the general formula:

$$A + [O-CO-(O)_n-R-NCO]_m$$

wherein
   $m$ is an integer of from 2 to 10;
   $n$ is 0 or 1;
   A is an m-valent residue having a molecular weight of from about 500 to about 18,000 which residue is free of Zerewitinof-active hydrogen atoms and which is obtained by removal of the hydroxyl groups from a polymer which contains hydroxyl groups; and
   R is a divalent aliphatic or cycloaliphatic hydrocarbon radical containing one to 20 carbon atoms to impart shrink-proofing properties to said textile.

2. The textile of claim 1 wherein the polyisocyanate is a solution in an inert organic solvent said solution having a solids content of from about 1 percent to about 15 percent by weight.

3. The textile of claim 2 wherein the inorganic solvent is perchloroethylene.

4. The textile of claim 1 wherein the polyisocyanate is an aqueous emulsion having a solids content of from about 1 percent to about 15 percent by weight.

* * * * *